United States Patent
Kim et al.

(10) Patent No.: US 8,634,319 B2
(45) Date of Patent: Jan. 21, 2014

(54) METHOD WHEREBY A CHANNEL QUALITY INDICATOR IS FED BACK BY A TERMINAL IN A MULTIPLE-ANTENNA WIRELESS COMMUNICATION SYSTEM, AND A DEVICE THEREFOR

(75) Inventors: Bong Hoe Kim, Anyang-si (KR); Dong Wook Roh, Anyang-si (KR); Byeong Woo Kang, Anyang-si (KR); Dae Won Lee, Anyang-si (KR); Yu Jin Noh, Anyang-si (KR); Ki Jun Kim, Anyang-si (KR); Joon Kui Ahn, Anyang-si (KR)

(73) Assignee: LG Electronics Inc., Seoul (KR)

( * ) Notice: Subject to any disclaimer, the term of this patent is extended or adjusted under 35 U.S.C. 154(b) by 178 days.

(21) Appl. No.: 13/139,484

(22) PCT Filed: Sep. 27, 2010

(86) PCT No.: PCT/KR2010/006537
§ 371 (c)(1),
(2), (4) Date: Jun. 13, 2011

(87) PCT Pub. No.: WO2011/037426
PCT Pub. Date: Mar. 31, 2011

(65) Prior Publication Data
US 2011/0243026 A1 Oct. 6, 2011

Related U.S. Application Data

(60) Provisional application No. 61/246,156, filed on Sep. 27, 2009.

(51) Int. Cl.
*H04L 12/26* (2006.01)
(52) U.S. Cl.
USPC .................. 370/252; 455/67.11; 709/228

(58) Field of Classification Search
None
See application file for complete search history.

(56) References Cited

U.S. PATENT DOCUMENTS

2007/0147536 A1* 6/2007 Melzer et al. ................. 375/267
2010/0279621 A1* 11/2010 Brown et al. ............. 455/67.11
2012/0106450 A1 5/2012 Golitschek Edler Von Elbwart

FOREIGN PATENT DOCUMENTS

EP 2 007 050 A9 12/2008
(Continued)

OTHER PUBLICATIONS

Ghosh et al., "Uplink Control Channel Design for 3GPP LTE," 18th Annual IEEE International Symposium on Personal, Indoor and Mobile Radio Communications, Sep. 9, 2007, pp. 1-5.

(Continued)

*Primary Examiner* — Yemane Mesfin
*Assistant Examiner* — Khoa Huynh
(74) *Attorney, Agent, or Firm* — Birch, Stewart, Kolasch & Birch, LLP

(57) ABSTRACT

Disclosed is a method whereby a channel quality indicator is fed back by a terminal in a multiple-antenna wireless communication system. More specifically, the method comprises the steps of: receiving reference signals corresponding to a plurality of data streams from a base station; using the reference signals to calculate a channel quality indicator; and transmitting the calculated channel quality indicator to the base station; and, in the step in which the channel quality indicator is calculated, the channel quality indicator is calculated under the assumption that at least one of the reference signals has been transmitted using wither the spatial-multiplexing technique or the transmit diversity technique, depending on the feedback setting of the terminal.

10 Claims, 7 Drawing Sheets

(56) References Cited

FOREIGN PATENT DOCUMENTS

| JP | 2012-520643 A | 9/2012 |
|---|---|---|
| WO | WO 2007/081181 A2 | 7/2007 |
| WO | WO 2009/023863 A1 | 2/2009 |
| WO | WO 2009/074880 A2 | 6/2009 |
| WO | WO 2009/099151 A1 | 8/2009 |
| WO | WO 2009/113766 A1 | 9/2009 |

OTHER PUBLICATIONS

Huawei et al., "Correction to CQI/PMI/RI reporting field," 3GPP TSG-RAN-WG1 Meeting #55bis, R1-090475, Ljubljana, Slovenia, Jan. 12-16, 2009, 15 pages.

Huawei et al., "Correction to CQI/PMI/RI reporting field," 3GPP TSG-RAN-WG1 Meeting #56, R1-091021, Athens, Greece, Feb. 9-13, 2009, 16 pages.

* cited by examiner (a) Control-Plane Protocol Stack (b) User-Plane Protocol Stack

METHOD WHEREBY A CHANNEL QUALITY INDICATOR IS FED BACK BY A TERMINAL IN A MULTIPLE-ANTENNA WIRELESS COMMUNICATION SYSTEM, AND A DEVICE THEREFOR

This application is the National Phase of PCT/KR2010/006537 filed on Sep. 27, 2010, which claims priority under 35 U.S.C. 119(e) to US Provisional Application No. 61/246,156 filed on Sep. 27, 2009, all of which are hereby expressly incorporated by reference into the present application.

TECHNICAL FIELD

The present invention relates to a wireless communication system, and more particularly, to a feedback method of a channel quality indicator at a terminal in a multiple-antenna wireless communication system, and an apparatus therefor.

BACKGROUND ART

Multiple-Input Multiple-Output (MIMO) refers to a method of using multiple transmission antennas and multiple reception antennas to improve data transmission/reception efficiency. Namely, a plurality of antennas is used in a transmitter or a receiver of a wireless communication system so that capacity can be increased and performance can be improved. Hereinafter, MIMO may indicate multiple antennas in this document.

MIMO technology does not depend on a single antenna path to receive a single total message. Instead, MIMO technology collects data fragments received via several antennas, merges the data fragments, and completes data. The use of MIMO technology can increase system coverage while improving a data transmission rate within a cell area of a specific size or guaranteeing a specific data transmission rate. MIMO technology can be widely used in mobile communication terminals and relay nodes. MIMO technology can overcome the limitations of the restricted amount of transmission data of single antenna based mobile communication systems.

The configuration of a general MIMO communication system is shown in FIG. 1. A transmitter is equipped with $N_T$ transmission antennas and a receiver is equipped with $N_R$ reception antennas. If a plurality of antennas is used both in the transmitter and in the receiver, theoretical channel transmission capacity increases unlike the case where only either the transmitter or the receiver uses a plurality of antennas. Increase in channel transmission capacity is proportional to the number of antennas, thereby improving transmission rate and frequency efficiency. If a maximum transmission rate when using a signal antenna is $R_o$, a transmission rate when using multiple antennas can be theoretically increased by multiplication of the maximum transmission rate $R_o$ by a rate increment $R_i$. The rate increment $R_i$ is represented by the following equation 1 where $R_i$ is the smaller of $N_T$ and $N_R$.

$$R_i = \min(N_T, N_R) \quad \text{[Equation 1]}$$

For example, in a MIMO communication system using four transmission antennas and four reception antennas, it is possible to theoretically acquire a transmission rate four times that of a single antenna system. After an increase in the theoretical capacity of the MIMO system was first proved in the mid-1990s, various techniques for substantially improving the data transmission rate have been actively developed. Several of these techniques have already been incorporated into a variety of wireless communication standards including, for example, 3$^{rd}$ generation mobile communication and next-generation wireless local area networks.

Active research up to now related to the MIMO technology has focused upon a number of different aspects, including research into information theory related to MIMO communication capacity calculation in various channel environments and in multiple access environments, research into wireless channel measurement and model derivation of MIMO systems, and research into space-time signal processing technologies for improving transmission reliability and transmission rate.

To describe a communication method in a MIMO system in detail, a mathematical model thereof is given below. As shown in FIG. 1, it is assumed that $N_T$ transmission antennas and $N_R$ reception antennas are present. In the case of a transmission signal, a maximum number of transmittable pieces of information is $N_T$ under the condition that $N_T$ transmission antennas are used, so that transmission information can be represented by a vector represented by the following equation 2:

$$S = [S_1, S_2, \ldots, S_{N_T}]^T \quad \text{[Equation 2]}$$

Meanwhile, individual transmission information pieces $S_1$, $S_2, \ldots, S_{N_T}$ may have different transmission powers. In this case, if the individual transmission powers are denoted by $P_1$, $P_2, \ldots, P_{N_T}$, transmission information having an adjusted transmission power can be represented by a vector shown in the following equation 3:

$$\hat{S} = [\hat{S}_1, \hat{S}_2, \ldots, \hat{S}_{N_T}]^T = [P_1 S_1, P_2 S_2, \ldots, P_{N_T} S_{N_T}]^T \quad \text{[Equation 3]}$$

In Equation 3, using a diagonal matrix P of a transmission power, $\hat{S}$ can be represented by the following equation 4:

$$\hat{s} = \begin{bmatrix} P_1 & & & 0 \\ & P_2 & & \\ & & \ddots & \\ 0 & & & P_{N_T} \end{bmatrix} \begin{bmatrix} s_1 \\ s_2 \\ \vdots \\ s_{N_T} \end{bmatrix} = Ps \quad \text{[Equation 4]}$$

A weight matrix W may be applied to the information vector $\hat{S}$ having an adjusted transmission power to configure $N_T$ transmission signals $x_1, x_2, \ldots, x_{N_T}$ to be actually transmitted. In this case, the weight matrix is adapted to properly distribute transmission information to individual antennas according to transmission channel situations. The transmission signals $x_1, x_2, \ldots, x_{N_T}$ can be represented by the following equation 5 using a vector x, where $w_{ij}$ is a weight between the i-th transmission antenna and the j-th information, and W is a weight matrix or a preceding matrix.

$$x = \begin{bmatrix} x_1 \\ x_2 \\ \vdots \\ x_i \\ \vdots \\ x_{N_t} \end{bmatrix} = \begin{bmatrix} w_{11} & w_{12} & \cdots & w_{1N_T} \\ w_{21} & w_{22} & \cdots & w_{2N_T} \\ \vdots & & \ddots & \\ w_{i1} & w_{i2} & \cdots & w_{iN_T} \\ \vdots & & \ddots & \\ w_{N_T 1} & w_{N_T 2} & \cdots & w_{N_T N_T} \end{bmatrix} \begin{bmatrix} \hat{s}_1 \\ \hat{s}_2 \\ \vdots \\ \hat{s}_j \\ \vdots \\ \hat{s}_{N_T} \end{bmatrix} = \quad \text{[Equation 5]}$$

$$W\hat{s} = WPs$$

Meanwhile, in a spatial multiplexing scheme, the individual transmission information pieces $S_1, S_2, S_{N_T}$ have different values. In a transmit diversity scheme, however, the individual transmission information pieces $S_2, \ldots, S_{N_T}$ have the same value. A general transmit diversity scheme includes Space Time Block Coding (STBC), Space Frequency Block Coding (SFBC) and Cyclic Delay Diversity (CDD).

DISCLOSURE

Technical Problem

A feedback method of a channel quality indicator at a terminal in a multiple-antenna wireless communication system, and an apparatus therefor are proposed based on the above description.

Technical Solution

As one aspect of the present invention to solve the above-mentioned technical problem, a method for feeding back a channel quality indicator at a terminal in a multiple-antenna wireless communication system includes receiving reference signals corresponding to a plurality of data streams from a base station, calculating a channel quality indicator using the reference signals, and transmitting the calculated channel quality indicator to the base station, wherein the calculation of the channel quality indicator includes calculating the channel quality indicator under the assumption that the reference signals have been transmitted using a spatial multiplexing scheme or a transmit diversity scheme according to feedback setting of the terminal.

If the terminal is set to report a precoding matrix index, the terminal may calculate the channel quality indicator under the assumption that the reference signals have been transmitted using the spatial multiplexing scheme, and if the terminal is set not to report the precoding matrix index, the terminal may calculate the channel quality indicator under the assumption that the reference signals have been transmitted using the transmit diversity scheme.

If the terminal is set to report the precoding matrix index, a maximum rank of the spatial multiplexing scheme may be 2.

If the terminal is set not to report the precoding matrix index, the terminal may calculate the channel quality indicator under the assumption that a precoding matrix of an identity matrix form or a precoding matrix combined with an identity matrix has been applied to the reference signals. Alternatively, if the terminal is set not to report the precoding matrix index, the terminal may calculate the channel quality indicator under the assumption that a first precoding matrix or a second precoding matrix has been applied according to a unit time.

In another aspect of the present invention, provided herein is a terminal device in a multiple-antenna wireless communication system including a reception module for receiving reference signals corresponding to a plurality of data streams from a base station, a processor for calculating a channel quality indicator using the reference signals, and a transmission module for transmitting the calculated channel quality indicator to the base station, wherein the processor calculates the channel quality indicator under the assumption that the reference signals have been transmitted using a spatial multiplexing scheme or a transmit diversity scheme according to feedback setting of the terminal device.

If the terminal device is set to report a precoding matrix index, the processor may calculate the channel quality indicator under the assumption that the reference signals have been transmitted using the spatial multiplexing scheme, and if the terminal device is set not to report the precoding matrix index, the processor may calculate the channel quality indicator under the assumption that the reference signals have been transmitted using the transmit diversity scheme.

If the terminal device is set not to report the precoding matrix index, the processor may calculate the channel quality indicator under the assumption that a precoding matrix of an identity matrix form or a precoding matrix combined with an identity matrix has been applied to the reference signals. Alternatively, if the terminal device is set not to report the precoding matrix index, the processor may calculate the channel quality indicator under the assumption that a first precoding matrix or a second precoding matrix has been applied according to a unit time.

The one or more reference signals may correspond to multiple antennas of the base station, respectively.

Advantageous Effects

According to embodiments of the present invention, a terminal can effectively transmits feedback information, such as a channel quality indicator, to a base station in a multiple-antenna wireless communication system.

The effects of the present invention are not limited to the above-mentioned effects, and other effects not mentioned above can be clearly understood by one skilled in the art from the following description.

DESCRIPTION OF DRAWINGS

The accompanying drawings, which are included to provide a further understanding of the invention, illustrate embodiments of the invention and together with the description serve to explain the principle of the invention.

In the drawings.

BEST MODE

The above and other aspects of the present invention will be easily understood from the exemplary embodiments of the present invention described below with reference to the accompanying drawings. The exemplary embodiments described hereinbelow are examples in which technical features of the present invention are applied to a 3$^{rd}$ Generation Partnership Project (3GPP) system.

In this specification, a 3GPP Long Term Evolution (LTE) (Release-8) system is referred to as an LTE system or a legacy system. A terminal supporting the LTE system is referred to as an LTE terminal or a legacy terminal. A 3GPP LTE-Advanced (LTE-A) (Release-9) system is referred to as an LTE-A system or an evolved system. A terminal supporting the LTE-A system is referred to as an LTE-A terminal or an evolved terminal.

For convenience, although the embodiments of the present invention are described based on the LTE system and the LTE-A system, the embodiments of the present invention are applicable to any communication system corresponding to the above definition. Although the embodiments of the present invention are described based on a Frequency Division Duplexing (FDD) scheme by way of example, the embodiments of the present invention may be easily modified and applied to a Half-Duplexing FDD (H-FDD) scheme or a Time Division Duplexing (TDD) scheme.

Figure 1:
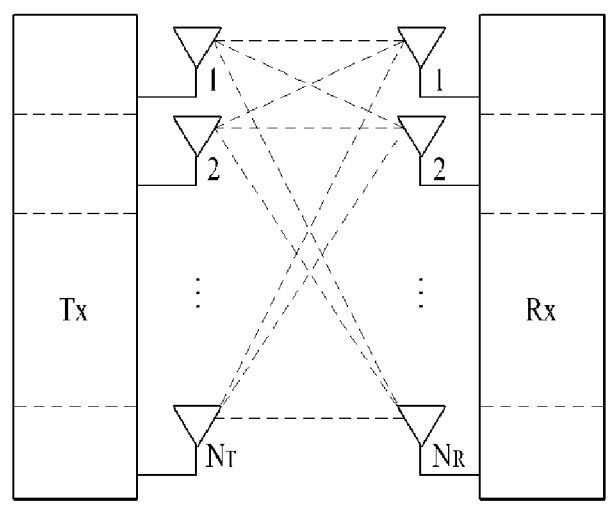
FIG. 1 is a diagram showing the configuration of a general MIMO communication system.
Figure 2:
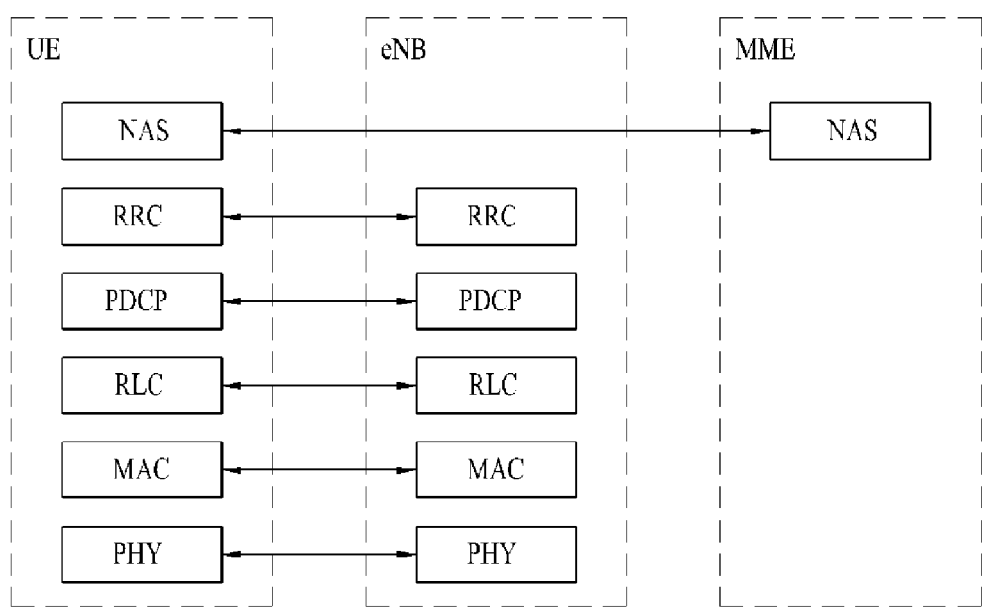
FIG. 2 is a diagram showing the structures of a control plane and a user plane of a radio interface protocol between a user equipment and an E-UTRAN based on the 3GPP radio access network standard.
Figure 2:
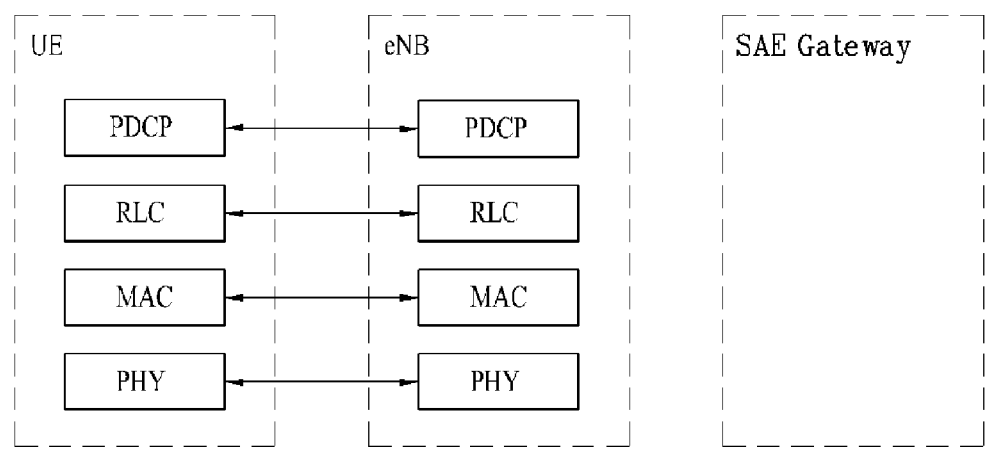

FIG. 2 is a diagram showing structures of a control plane and a user plane of a radio interface protocol between a terminal (i.e. User Equipment (UE)) and an Evolved-UMTS Terrestrial Radio Access Network (E-UTRAN) based on the 3GPP radio access network standard. The control plane refers to a path used for transmitting control messages which are used in the UE and the network to manage a call. The user plane refers to a path used for transmitting data generated in an application layer, e.g., voice data or Internet packet data.

A physical layer belonging to a first layer provides an information transfer service to an upper layer using a physical channel. The physical layer is connected to a Medium Access Control (MAC) layer of an upper layer via a transport channel. Data is transported between the MAC layer and the physical layer via the transport channel. Data is also transported between a physical layer of a transmitter and a physical layer of a receiver via the physical channel. The physical channel uses time and frequency as radio resources. Specifically, the physical channel is modulated using an Orthogonal Frequency Division Multiple Access (OFDMA) scheme in downlink and is modulated using a Single Carrier-Frequency Division Multiple Access (SC-FDMA) scheme in uplink.

A Medium Access Control (MAC) layer belonging to a second layer provides service to a Radio Link Control (RLC) layer of an upper layer via a logical channel. The RLC layer of the second layer supports reliable data transmission. The function of the RLC layer may be implemented by a functional block within the MAC. A Packet Data Convergence Protocol (PDCP) layer of the second layer performs a header compression function to reduce unnecessary control information for efficient transmission of an Internet Protocol (IP) packet such as IPv4 or IPv6 in a radio interface having a narrow bandwidth.

A Radio Resource Control (RRC) layer located at the bottommost portion belonging to a third layer is defined only in the control plane. The RRC layer controls logical channels, transport channels, and physical channels in relation to configuration, re-configuration, and release of Radio Bearers (RBs). The RB refers to a service provided by the second layer to transmit data between the UE and the network. To this end, the RRC layer of the UE and the RRC layer of the network exchange RRC messages. The UE is in an RRC connected mode if an RRC connection has been established between the RRC layer of the radio network and the RRC layer of the UE. Otherwise, the UE is in an RRC idle mode. A Non-Access Stratum (NAS) layer located at an upper level of the RRC layer performs functions such as session management and mobility management.

One cell constituting a Base Station (BS) (i.e. eNB) is set to use one of bandwidths 1.25, 2.5, 5, 10, 15, and 20 MHz, providing a downlink or uplink transmission service to several UEs. Different cells may be set to provide different bandwidths.

Downlink transport channels for data transmission from the network to the UE include a Broadcast Channel (BCH) for transmitting system information, a Paging Channel (PCH) for transmitting paging messages, and a downlink Shared Channel (SCH) for transmitting user traffic or control messages. Traffic or control messages of a downlink multicast or broadcast service may be transmitted through the downlink SCH or may be transmitted through an additional downlink Multicast Channel (MCH). Meanwhile, uplink transport channels for data transmission from the UE to the network include a Random Access Channel (RACH) for transmitting initial control messages and an uplink SCH for transmitting user traffic or control messages. Logical channels, which are located at an upper level of the transport channels and are mapped to the transport channels, include a Broadcast Control Channel (BCCH), a Paging Control Channel (PCCH), a Common Control Channel (CCCH), a Multicast Control Channel (MCCH), and a Multicast Traffic Channel (MTCH).

Figure 3:
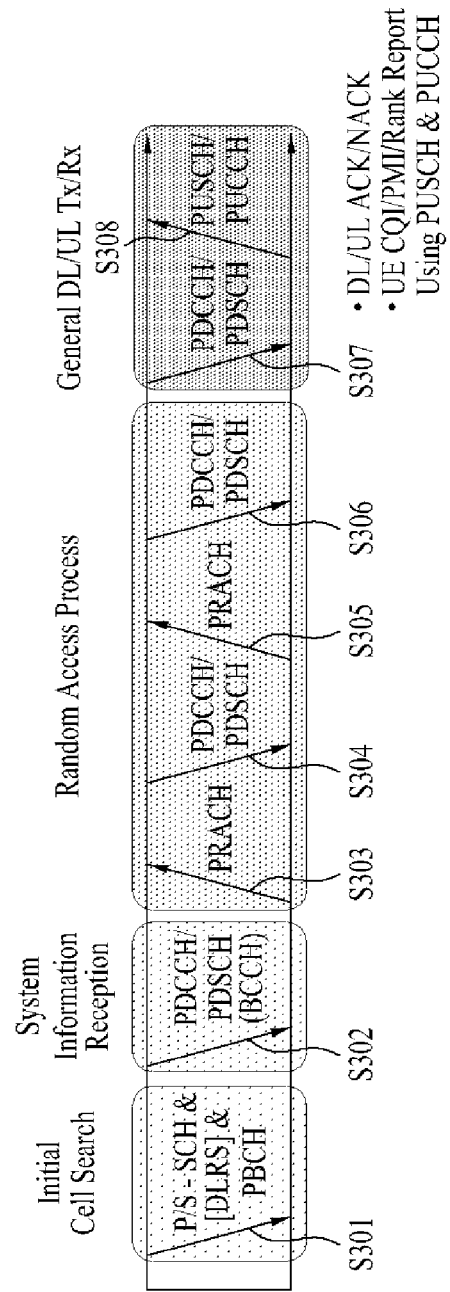
FIG. 3 is a diagram showing physical channels used in a 3GPP system and a general signal transmission method using the same.

FIG. 3 is a diagram showing physical channels used in a 3GPP system and a general signal transmission method using the same.

A UE performs an initial cell search operation such as establishment of synchronization with a BS when power is turned on or the UE enters a new cell (step S301). The UE may receive a Primary Synchronization Channel (P-SCH) and a Secondary Synchronization Channel (S-SCH) from the BS, establish synchronization with the BS, and acquire information such as a cell identity (ID). Thereafter, the UE may receive a physical broadcast channel from the BS to acquire broadcast information within the cell. Meanwhile, the UE may receive a Downlink Reference Signal (DL RS) in the initial cell search step to confirm a downlink channel state.

Upon completion of the initial cell search, the UE may receive a Physical Downlink Control Channel (PDCCH) and a Physical Downlink Shared Channel (PDSCH) according to information included in the PDCCH to acquire more detailed system information (step S302).

Meanwhile, if the UE initially accesses the BS or if radio resources for signal transmission are not present, the UE may perform a random access procedure (steps S303 to S306) with respect to the BS. To this end, the UE may transmit a specific sequence through a Physical Random Access Channel (PRACH) as a preamble (steps S303 and S305), and receive a response message to the preamble through the PDCCH and the PDSCH corresponding thereto (steps S304 and S306). In the case of a contention-based RACH, a contention resolution procedure may additionally be performed.

Upon completion of the above procedures, the UE may receive a PDCCH/PDSCH (step S307) and transmit a Physical Uplink Shared Channel (PUSCH)/Physical Uplink Control Channel (PUCCH) (step S308) as general uplink/downlink signal transmission procedures. Control information, transmitted by the UE to the BS through uplink or received by the UE from the BS through downlink, includes a downlink/uplink Acknowledgement/Negative Acknowledgement (ACK/NACK) signal, a Channel Quality Indicator (CQI), a Precoding Matrix Index (PMI), a Rank Indicator (RI), and the like. In the case of the 3GPP LTE system, the UE may transmit the control information such as CQI/PMI/RI through the PUSCH and/or the PUCCH.

Figure 4:
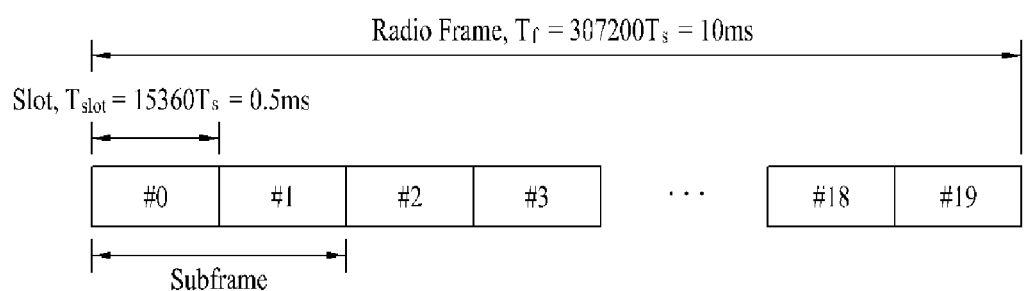
FIG. 4 is a diagram showing the structure of a radio frame used in an LTE system.

FIG. 4 is a diagram showing the structure of a radio frame used in an LTE system.

Referring to FIG. 4, the radio frame has a length of 10 ms (307200 $T_s$) and includes 10 subframes of equal size. Each of the subframes has a length of 1 ms and includes two slots. Each of the slots has a length of 0.5 ms (15360 $T_s$). In this case, $T_s$ denotes a sampling time, and is represented by $T_s=1/(15\ \text{kHz}\times 2048)=3.2552\times 10^{-8}$ (about 33 ns). Each slot includes a plurality of OFDM symbols in a time domain and includes a plurality of Resource Blocks (RBs) in a frequency domain. In the LTE system, one resource block includes 12 subcarriers×7 (or 6) OFDM symbols. A Transmission Time Interval (TTI) which is a unit time for data transmission may be determined in units of one or more subframes. The above-described structure of the radio frame is purely exemplary and various modifications may be made to the number of subframes included in the radio frame, the number of slots included in a subframe, or the number of OFDM symbols included in a slot.

Figure 5:
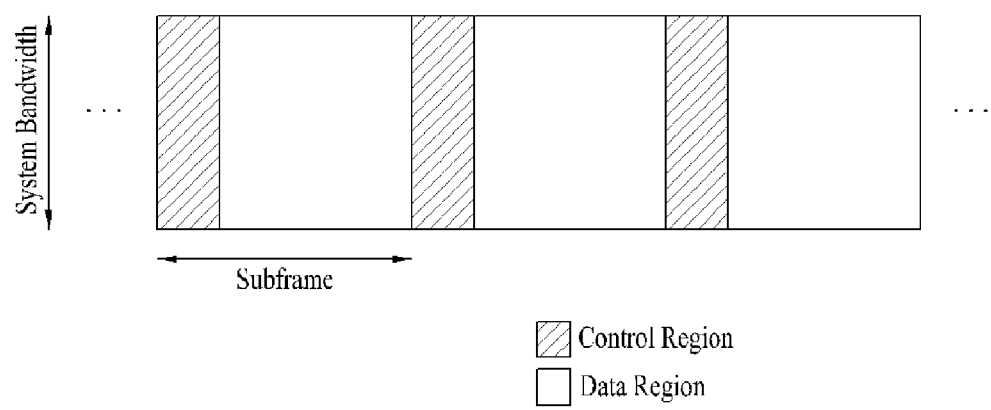
FIG. 5 is a diagram showing a functional structure of a downlink radio frame.

FIG. 5 is a diagram showing a functional structure of a downlink radio frame.

Referring to FIG. 5, the downlink radio frame includes 10 equally sized subframes. In the 3GPP LTE system, the subframes are defined as a basic time unit for packet scheduling over all downlink frequencies. Each subframe is divided into a control region for transmitting scheduling information and other control channels and a data region for transmitting downlink data. The control region is started from the first OFDM symbol of a subframe and includes one or more OFDM symbols. The size of the control region may be independently set with respect to the subframes. The control region is used to transmit layer 1/layer 2 (L1/L2) control signals. The data region is used to transmit downlink traffic.

Figure 6:
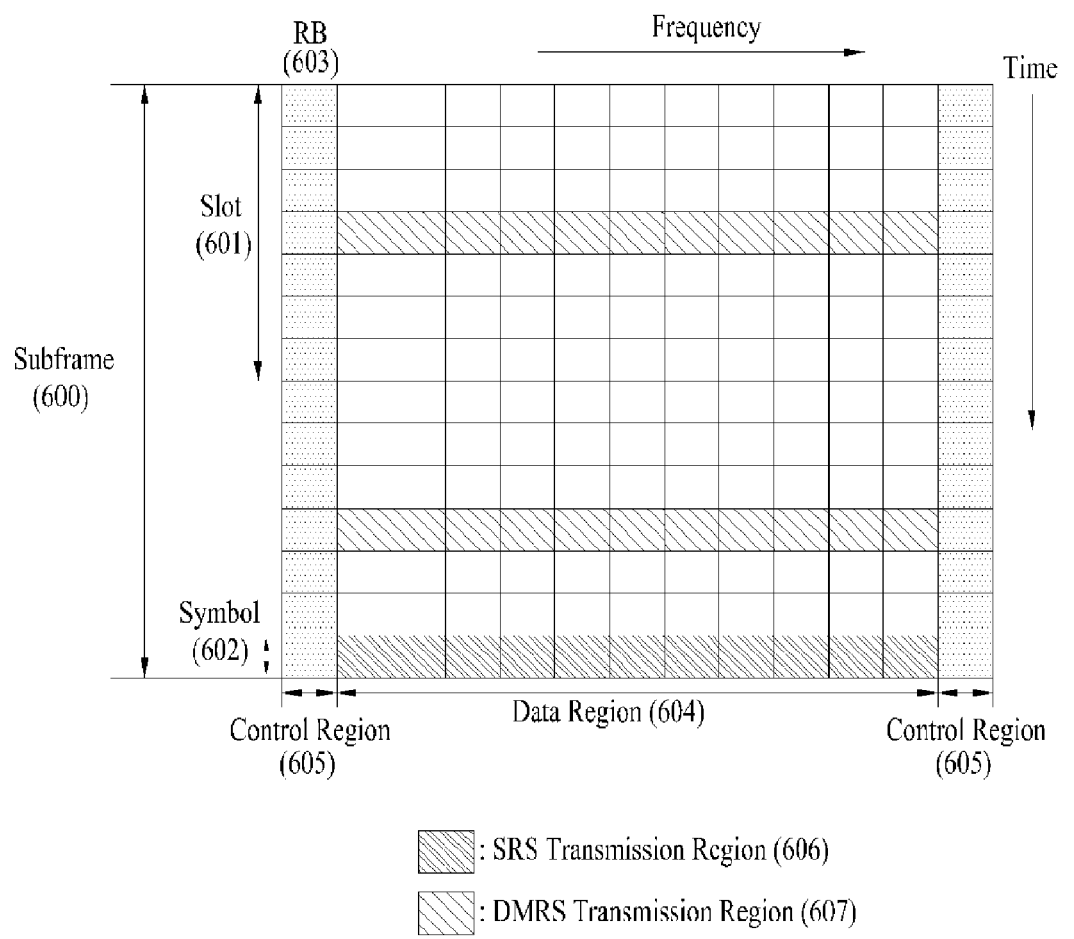
FIG. 6 is a diagram showing the structure of an uplink subframe used in an LTE system.

FIG. 6 is a diagram showing the structure of an uplink subframe used in an LTE system.

Referring to FIG. 6, a 1 ms subframe 600, which is a basic unit of LTE uplink transmission, consists of two 0.5 ms slots 601. When assuming a length of a normal Cyclic Prefix (CP), each slot consists of 7 symbols 602 and one symbol corresponds to one SC-FDMA symbol. A resource block 603 is a resource allocation unit corresponding to 12 subcarriers in a frequency domain and one slot in a time domain. The structure of the uplink subframe of the LTE system is broadly divided into a data region 604 and a control region 605. The data region refers to a series of communication resources used upon transmitting data such as voice and packets transmitted to each UE and corresponds to resources except for the control region within the subframe. The control region refers to a series of communication resources used upon transmitting a downlink channel quality report received from each UE, a downlink ACK/NACK signal, and an uplink scheduling request.

As shown in FIG. 6, a region 606 where a Sounding Reference Signal (SRS) can be transmitted within one subframe is an interval where the last SC-FDMA symbol is located on a time domain within one subframe and the SRS is transmitted through a data transmission band on a frequency domain. SRSs of several UEs transmitted through the last SC-FDMA symbol of the same subframe may be distinguished by a cyclic shift value. Regions 507 where a Demodulation Reference Signal (DMRS) is transmitted within one subframe are intervals where a middle SC-FDMA symbol within one slot, that is, the fourth SC-FDMA symbol and the eleventh SC-FDMA symbol are located. The DMRS is transmitted through the data transmission band on a frequency domain.

Figure 7:
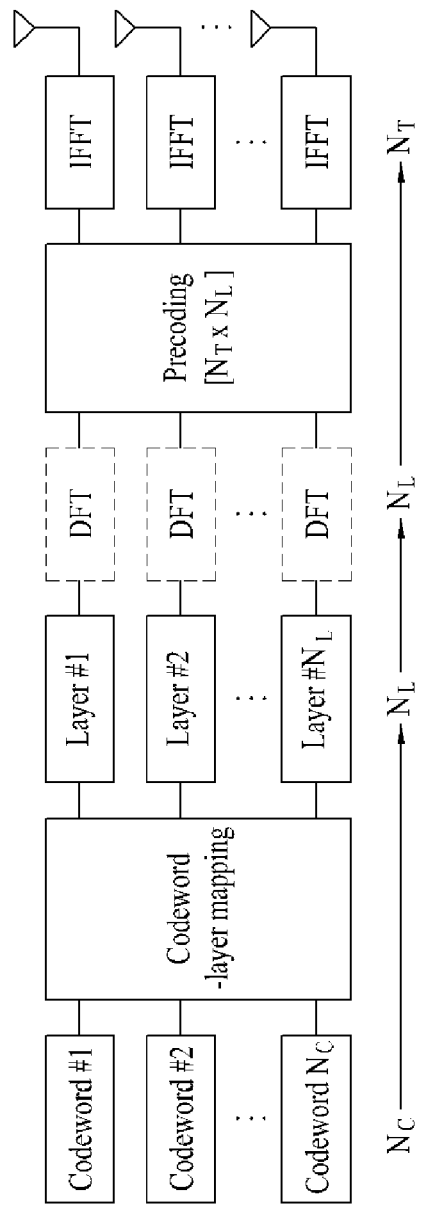
FIG. 7 is a diagram explaining a mapping relationship between codewords, layers, and antennas for transmitting a downlink signal in a MIMO wireless communication system.

FIG. 7 is a diagram explaining a mapping relationship between codewords, layers, and antennas for transmitting a downlink signal in a MIMO wireless communication system.

Referring to FIG. 7, a complicated mapping relationship exists between data information and transmission symbols. A MAC layer as data information transmits $N_c$ transport blocks to a physical layer. In the physical layer, the transport blocks are converted into codewords through a channel coding process and rate matching such as a puncturing or repetition process is performed. In this case, channel coding is performed in a channel coder such as a turbo encoder or a tail bit convolution encoder.

After the channel coding and rate matching processes, $N_c$ codewords are mapped to $N_L$ layers. A layer refers to each of different pieces of information transmitted using MIMO technology. The number of layers cannot be greater than a rank which is a maximum number capable of transmitting different pieces of information. This can be expressed by # of Layers≤rank(H)≤min($N_T$, $N_R$). H denotes a channel matrix.

For reference, unlike OFDMA transmission which is a general downlink transmission scheme, an uplink signal transmitted according to an SC-FDMA scheme is subject to a DFT process with respect to each layer so that a transmission signal has properties of a single subcarrier by partially offsetting an influence of Inverse Fast Fourier Transform (IFFT) processing.

DFT-converted signals in each layer are multiplied by a precoding matrix, mapped to $N_T$ transmission antennas, and transmitted to a BS through an IFFT process.

Generally, a downlink RS includes a common RS and a UE specific RS. Precoding is not applied to the common RS. Meanwhile, the UE specific RS is inserted in a precoding front part in the same way as general data and is precoded. The precoded UE specific RS is then transmitted to a UE.

For non-channel dependent spatial multiplexing transmission using a UE specific RS, that is, a dedicated RS, a few constraint conditions exist. First, in order to reduce signaling overhead of an RS, a transmitted RS should be precoded using the same precoding matrix as a modulated data symbol. Further, in order to obtain spatial channel diversity, a preceding matrix should be switched between antennas. However, it is not easy to satisfy the constraint conditions because the dedicated RS is transmitted according to a specific rule or randomly over all transmission resource areas. Namely, since channel measurement is performed in units of a specific number of resource elements for channel measurement efficiency, a precoding matrix for precoding the dedicated RS cannot be changed in units of resource elements. Accordingly, if the precoding matrix is changed in units of every resource element and if a precoded dedicated RS is not present in every resource element, the dedicated RS cannot perform channel measurement of a resource element transmitting preceded data.

Meanwhile, in order to report a CQI to a BS, a UE generates CQI information by measuring a channel under the assumption that the BS transmits an RS signal in a transmission mode shown in the following Table 1. That is, Table 1 below represents a PDSCH transmission mode of a BS assumed for CQI measurement of a UE.

TABLE 1

| Transmission mode | Transmission scheme of PDSCH |
| --- | --- |
| 1 | Single-antenna port, port 0 |
| 2 | Transmit diversity |
| 3 | Transmit diversity if the associated rank indicator is 1, otherwise large delay CDD |
| 4 | Closed-loop spatial multiplexing |
| 5 | Multi-user MIMO |
| 6 | Closed-loop spatial multiplexing with a single transmission layer |

TABLE 1-continued

| Transmission mode | Transmission scheme of PDSCH |
|---|---|
| 7 | If the number of PBCH antenna ports is one, Single-antenna port, port 0; otherwise Transmit diversity |

For example, transmission mode 7 in Table 1 denotes a beamforming transmission mode and supports a single data stream, that is, rank-1 transmission. If a plurality of PBCH antenna ports are present, the PDSCH transmission mode of the BS for CQI measurement is assumed as transmit diversity. A CQI is fed back to the BS as an index form as shown in the following Table 2. The BS determines a transmission format, such as a modulation scheme and a code rate, corresponding to the feedback CQI and performs downlink transmission to the UE.

TABLE 2

| CQI Index | Modulation | Code rate × 1024 | Efficiency |
|---|---|---|---|
| 0 | | Out of range | |
| 1 | QPSK | 78 | 0.1523 |
| 2 | QPSK | 120 | 0.2344 |
| 3 | QPSK | 193 | 0.3770 |
| 4 | QPSK | 308 | 0.6016 |
| 5 | QPSK | 449 | 0.8770 |
| 6 | QPSK | 602 | 1.1758 |
| 7 | 16QAM | 378 | 1.4766 |
| 8 | 16QAM | 490 | 1.9141 |
| 9 | 16QAM | 616 | 2.4063 |
| 10 | 64QAM | 466 | 2.7305 |
| 11 | 64QAM | 567 | 3.3223 |
| 12 | 64QAM | 666 | 3.9023 |
| 13 | 64QAM | 772 | 4.5234 |
| 14 | 64QAM | 873 | 5.1152 |
| 15 | 64QAM | 948 | 5.5547 |

Generally, a MIMO system may support transmission of multiple data streams for data transmission rate improvement. In the present invention, a CQI measurement scheme based on a PMI and a CQI measurement scheme based on transmit diversity are proposed as a feedback method of channel information to support transmission of multiple data streams in a MIMO system.

<CQI Measurement Scheme Based on PMI>

A MIMO system supporting transmission of multiple data streams refers to a precoding-based spatial multiplexing system. Accordingly, a receiver receiving RSs for CQI measurement, that is, a UE may measure CQI under the assumption that a BS has applied a precoding matrix. For example, if the number of logical antenna ports of the BS recognized by the UE is 2, the UE measures a CQI under the assumption that one of the precoding matrices shown in the following Table 3 has been applied to PDSCH transmission.

TABLE 3

| Codebook index | Number of layers $v$ | |
|---|---|---|
| | 1 | 2 |
| 0 | $\frac{1}{\sqrt{2}}\begin{bmatrix}1\\1\end{bmatrix}$ | $\frac{1}{\sqrt{2}}\begin{bmatrix}1 & 0\\0 & 1\end{bmatrix}$ |
| 1 | $\frac{1}{\sqrt{2}}\begin{bmatrix}1\\-1\end{bmatrix}$ | $\frac{1}{2}\begin{bmatrix}1 & 1\\1 & -1\end{bmatrix}$ |
| 2 | $\frac{1}{\sqrt{2}}\begin{bmatrix}1\\j\end{bmatrix}$ | $\frac{1}{2}\begin{bmatrix}1 & 1\\j & -j\end{bmatrix}$ |
| 3 | $\frac{1}{\sqrt{2}}\begin{bmatrix}1\\-j\end{bmatrix}$ | — |

If the number of logical antenna ports of the BS recognized by the UE is 4, the UE measures CQI under the assumption that one of precoding matrices shown in the following Table 3 has been applied to PDSCH transmission.

TABLE 4

| Codebook index | $u_n$ | Number of layers $v$ | |
|---|---|---|---|
| | | 1 | 2 |
| 0 | $u_0 = [1\ -1\ -1\ -1]^T$ | $W_0^{\{1\}}$ | $W_0^{\{14\}}/\sqrt{2}$ |
| 1 | $u_1 = [1\ -j\ 1\ j]^T$ | $W_1^{\{1\}}$ | $W_1^{\{12\}}/\sqrt{2}$ |
| 2 | $u_2 = [1\ 1\ -1\ 1]^T$ | $W_2^{\{1\}}$ | $W_2^{\{12\}}/\sqrt{2}$ |
| 3 | $u_3 = [1\ j\ 1\ -j]^T$ | $W_3^{\{1\}}$ | $W_3^{\{12\}}/\sqrt{2}$ |
| 4 | $u_4 = [1\ (-1-j)/\sqrt{2}\ -j\ (1-j)/\sqrt{2}]^T$ | $W_4^{\{1\}}$ | $W_4^{\{14\}}/\sqrt{2}$ |
| 5 | $u_5 = [1\ (1-j)/\sqrt{2}\ j\ (-1-j)/\sqrt{2}]^T$ | $W_5^{\{1\}}$ | $W_5^{\{14\}}/\sqrt{2}$ |
| 6 | $u_6 = [1\ (1+j)/\sqrt{2}\ -j\ (-1+j)/\sqrt{2}]^T$ | $W_6^{\{1\}}$ | $W_6^{\{13\}}/\sqrt{2}$ |
| 7 | $u_7 = [1\ (-1+j)/\sqrt{2}\ j\ (1+j)/\sqrt{2}]^T$ | $W_7^{\{1\}}$ | $W_7^{\{13\}}/\sqrt{2}$ |
| 8 | $u_8 = [1\ -1\ 1\ 1]^T$ | $W_8^{\{1\}}$ | $W_8^{\{12\}}/\sqrt{2}$ |
| 9 | $u_9 = [1\ -j\ -1\ -j]^T$ | $W_9^{\{1\}}$ | $W_9^{\{14\}}/\sqrt{2}$ |
| 10 | $u_{10} = [1\ 1\ 1\ -1]^T$ | $W_{10}^{\{1\}}$ | $W_{10}^{\{13\}}/\sqrt{2}$ |
| 11 | $u_{11} = [1\ j\ -1\ j]^T$ | $W_{11}^{\{1\}}$ | $W_{11}^{\{13\}}/\sqrt{2}$ |
| 12 | $u_{12} = [1\ -1\ -1\ 1]^T$ | $W_{12}^{\{1\}}$ | $W_{12}^{\{12\}}/\sqrt{2}$ |
| 13 | $u_{13} = [1\ -1\ 1\ -1]^T$ | $W_{13}^{\{1\}}$ | $W_{13}^{\{13\}}/\sqrt{2}$ |
| 14 | $u_{14} = [1\ 1\ -1\ -1]^T$ | $W_{14}^{\{1\}}$ | $W_{14}^{\{13\}}/\sqrt{2}$ |
| 15 | $u_{15} = [1\ 1\ 1\ 1]^T$ | $W_{15}^{\{1\}}$ | $W_{15}^{\{12\}}/\sqrt{2}$ |

In Table 4, $W_n^{\{S\}}$ may be defined as a column vector subset $\{S\}$ of a mother matrix $W_n$. The mother matrix $W_n$ is expressed as $I - 2\mu_n\mu_n^H/\mu_n^H\mu_n$ (where I is a (4×4) identity matrix). The reason why the maximum number of layers is 2 in Table 4 is that, although up to rank-4 can be supported according to the number of antennas when the number of logical antenna ports is 4, dual-layer beamforming as in the present invention can support up to rank-2.

Meanwhile, in a precoding-based spatial multiplexing scheme, the UE selects an index of the precoding matrix of Table 3 or Table 4 according to a channel measurement result and feeds back the index to the BS in addition to CQI feedback. The BS may then perform spatial multiplexing using the index.

<CQI Measurement Scheme Based on Transmit Diversity>

Next, a CQI measurement scheme based on transmit diversity is described. Generally, a transmit diversity scheme refers to transmission of one data stream in the case of rank-1 and derives reception performance improvement in a UE through repetitive transmission through multiple antennas.

It is assumed that the number of logical antenna ports of a BS recognized by a UE is 2. If a rank is set to 1, the UE may measure a CQI under the assumption that the BS performs PDSCH transmission by applying a transmit diversity scheme as in single layer beamforming. This is because, even if the UE measures and reports a CQI under the assumption that the rank is 1 (i.e. the case where a transmit diversity scheme is applied), it can be determined that the BS performs PDSCH transmission according to rank 2. To assume that the transmit diversity scheme of the BS has been applied, the UE may measure a CQI using a specific precoding matrix. For example, the UE may measure a CQI using an identity matrix such as in index 0 of layer 2 in Table 3 under the assumption that the BS performs PDSCH transmission. In this case, since the specific precoding matrix is used for assumption for transmit diversity based CQI measurement when a rank is set to 2, it is unnecessary to feedback the specific precoding matrix to the BS.

It is also assumed that the number of logical antenna ports of a BS recognized by a UE is 4. If a rank is set to 1, the UE may measure a CQI under the assumption that the BS performs PDSCH transmission by applying a transmit diversity scheme as in single layer beamforming. This is because, even if the UE measures and reports a CQI under the assumption that the rank is 1, it can be determined that the BS performs PDSCH transmission according to rank 2. To assume that the transmit diversity scheme of the BS has been applied, the UE may measure a CQI using a specific precoding matrix. For example, the UE may measure a CQI by using a precoding matrix such as $$W_0^{[14]}/\sqrt{2} = \frac{1}{\sqrt{2}}\begin{bmatrix} 1 & 1 \\ 1 & -1 \\ 1 & 1 \\ 1 & -1 \end{bmatrix}$$

in index 0 of layer 2 in Table 4 or an arbitrary precoding matrix such as $$c\begin{bmatrix} 1 & 0 \\ 0 & 1 \\ 1 & 0 \\ 0 & 1 \end{bmatrix} = c\begin{bmatrix} I \\ I \end{bmatrix}$$

(where c is an arbitrary constant) combined with an identity matrix under the assumption that the BS performs PDSCH transmission. Similarly, since the specific precoding matrix is used for assumption for CQI measurement based on transmit diversity when a rank is set to 2, it is unnecessary to feedback the specific precoding matrix to the BS.

Meanwhile, even if the number of logical antenna ports is 4, it is assumed that PDSCH transmission in the BS is performed only through two antenna ports. In this case, an antenna port pair may be changed to a resource block unit or a specific number of resource block units.

In addition to a method using one specific precoding matrix, it may be assumed that PDSCH transmission is performed by selectively applying a precoding matrix within a preset set. Specifically, precoding matrices included in a precoding matrix set may be set to be differently applied in units of a resource block or in units of a specific number of resource blocks, based on information about a logical antenna port shared by the BS and the UE, that is, rank information. As another example, a precoding matrix may be changed in a time domain. Namely, the UE may be set during CQI measurement to use a precoding matrix $P_1$ in a time unit $T_1$ and use a precoding matrix $P_2$ in a time unit $T_2$.

According to antenna setting, orthogonality can be ensured between generated beams. That is, there may be no interference between beams. In this case, the UE may feed back CQI information corresponding to a maximum transmission rank. For convenience of description, if the number of logical antenna ports recognized by the UE is 2, the UE measures a CQI under the assumption that PDSCH transmission is performed using two antenna ports. In other words, it may be assumed that first PDSCH transmission is performed through antenna port 0 and second PDSCH transmission is performed through antenna port 1.

Meanwhile, if the number of logical antenna ports recognized by the UE is 4, the UE measures a CQI under the assumption that PDSCH transmission is performed through two transmit diversity schemes. Namely, it may be assumed that first PDSCH transmission is performed through two antenna ports (e.g. antenna port 0 and antenna port 1) and second PDSCH transmission is performed through the other antenna ports (e.g. antenna port 2 and antenna port 3).

Hereinafter, a CQI feedback scheme in a single-user MIMO system and a CQI feedback scheme in a multiple-user MIMO system are described. In the single-user MIMO system, transmission resources are used only for a single user. In the multiple-user MIMO system, transmission resources may be shared by a plurality of users. However, users cannot recognize whether transmission resources are multiplexed so that multiple users share them. Hereinbelow, an efficient feedback scheme for both the single-user MIMO system and the multiple-user MIMO system is proposed.

For convenience of description, it is assumed that the maximum number of transmission layers is 2. In this case, a UE measures and reports a CQI based always on the single-user MIMO system. That is, if a rank is 1, transmission resources may always be occupied by a single user. Then a BS may determine transmission format information such as a Modulation Coding Scheme (MCS) into which a compensation value for applying multi-user MIMO is incorporated.

As another example, the UE may consider a feedback method of both a CQI based on the single-user MIMO system and a CQI based on the multiple-user MIMO system. To implement this method, CQI parameters or formats for the respective MIMO systems may be differently set.

The UE may feed back additional information for the multiple-user MIMO system together with a CQI based on the single-user MIMO system. For example, a CQI for the multiple-user MIMO system may be transmitted as an offset value for a CQI for the single-user MIMO system.

Figure 8:
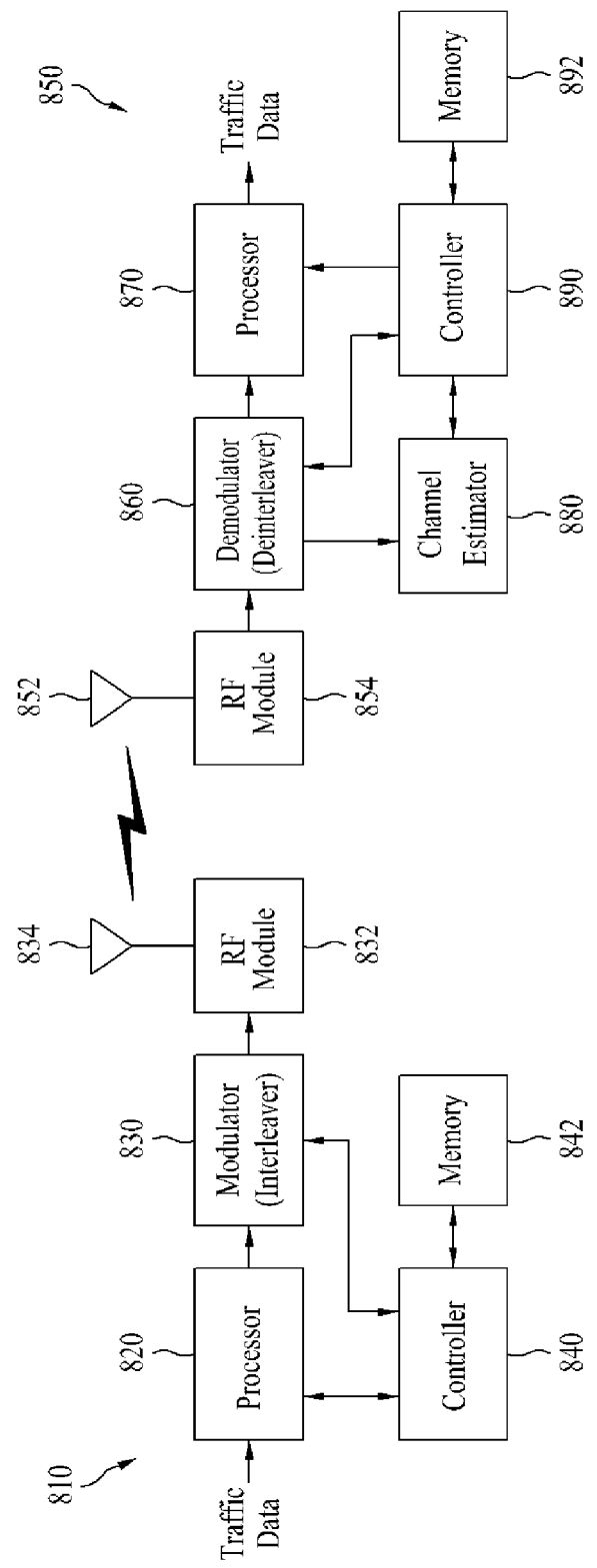
FIG. 8 is a block diagram of a UE device according to an exemplary embodiment of the present invention.

FIG. 8 is a block diagram illustrating a transmitter and a receiver according to an exemplary embodiment of the present invention. In downlink, a transmitter 810 is a part of a BS and a receiver 850 is a part of a UE. In uplink, the transmitter 810 is a part of the UE and the receiver 850 is a part of the BS.

In the transmitter 810, a processor 820 encodes, interleaves and symbol-maps data (e.g., traffic data and signaling) to generate data symbols. The processor 820 generates pilot symbols and multiplexes the data symbols and the pilot symbols.

A modulator 830 generates transmission symbols according to a radio access scheme. The radio access scheme includes FDMA, TDMA, CDMA, SC-FDMA, MC-FDMA, OFDMA, and combinations thereof. The modulator 830 causes data to be dispersed in a frequency domain and transmitted using various permutation methods exemplified in the embodiments of the present invention. A Radio Frequency (RF) module 832 performing processing (e.g. analog conversion, amplification, filtering, and frequency up-conversion) of the transmission symbols and generates an RF signal transmitted via an antenna 834.

In the receiver 850, an antenna 852 receives a signal transmitted from the transmitter 810 and provides the received signal to an RF module 854. The RF module 854 performs processing (e.g. filtering, amplification, frequency downconversion, and digitalization) of the received signal and provides input samples.

A demodulator 860 demodulates the input samples and provides data values and pilot values. A channel estimator 880 derives channel estimation values based on the received pilot values. The demodulator 860 detects (or equalizes) data with respect to the received data values by using the channel estimation values and provides data symbol estimation values for the transmitter 810. The demodulator 860 performs a reverse operation of various permutation methods exemplified in the embodiments of the present invention to re-arrange data dispersed in a frequency domain and a time domain to an original order. A processor 870 symbol-demaps, deinterleaves, and decodes the data symbol estimation values and provides decoded data.

Generally, processing at the demodulator 860 and the processor 870 in the receiver 850 is complementary to processing at the modulator 830 and the processor 820 in the transmitter 810, respectively.

Controllers 840 and 890 manage and control operation of various processing modules in the transmitter 810 and the receiver 850, respectively. Memories 842 and 892 store program code and data for the transmitter 810 and the receiver 850, respectively.

The modules shown in FIG. 8 are for description only and the transmitter and/or receiver may further include necessary modules. Some modules/functions may be omitted or separated into different modules, and two or more modules may be integrated into one module.

The exemplary embodiments described hereinabove are combinations of elements and features of the present invention. The elements or features should be considered selective unless explicitly mentioned otherwise. Each element or feature may be practiced without being combined with other elements or features. Further, an embodiment of the present invention may be constructed by combining parts of the elements and/or features. Operation orders described in the embodiments of the present invention may be rearranged. Some constructions or features of any one embodiment may be included in another embodiment and may be replaced with corresponding constructions or features of another embodiment. It will be obvious that claims that are not explicitly cited in the appended claims may be presented in combination as an exemplary embodiment of the present invention or included as a new claim by subsequent amendment after the application is filed.

In this document, the exemplary embodiments of the present invention have been described centering on a data transmission/reception relationship between a BS and a UE. A specific operation described as performed by the BS may be performed by an upper node of the BS in some cases. Namely, it is apparent that, in a network comprised of a plurality of network nodes including the BS, various operations performed for communication with the UE may be performed by the BS, or network nodes other than the BS. The term 'BS' may be replaced with the terms fixed station, Node B, eNode B (eNB), access point, etc. The term 'terminal' may be replaced with the terms User Equipment (UE), Mobile Station (MS), Mobile Subscriber Station (MSS), etc.

The embodiments of the present invention may be achieved by various means, for example, hardware, firmware, software, or a combination thereof. In a hardware configuration, the embodiments of the present invention may be achieved by one or more Application Specific Integrated Circuits (ASICs), Digital Signal Processors (DSPs), Digital Signal Processing Devices (DSPDs), Programmable Logic Devices (PLDs), Field Programmable Gate Arrays (FPGAs), processors, controllers, microcontrollers, microprocessors, etc.

In a firmware or software configuration, the embodiments of the present invention may be achieved by a module, a procedure, a function, etc. performing the above-described functions or operations. Software code may be stored in a memory unit and executed by a processor. The memory unit is located at the interior or exterior of the processor and may transmit data to and receive data from the processor via various known means.

It is apparent to those skilled in the art that the present invention may be carried out in other specific ways than those set forth herein without departing from the spirit and essential characteristics of the present invention. The above detailed description is therefore to be construed in all aspects as illustrative and not restrictive. The scope of the invention should be determined by reasonable interpretation of the appended, and all changes coming within the meaning and equivalency range of the appended claims are intended to be embraced therein.

INDUSTRIAL APPLICABILITY

Although the above description of the present invention has been focused upon an example applied to a 3GPP LTE system as a method and apparatus for transmitting a sounding reference signal in a MIMO wireless communication system, the present invention is applicable to a variety of MIMO wireless communication systems in addition to the 3GPP LTE system.

The invention claimed is:

1. A method for reporting a channel quality indicator at user equipment (UE) in a wireless communication system, comprising:
    receiving one or more common reference signals from a base station;
    computing a channel quality indicator for dual-layer transmission of a physical downlink shared channel, based on the one or more common reference signals; and
    reporting the channel quality indicator for the dual-layer transmission to the base station,
    wherein data is mapped to each of a first layer and a second layer corresponding to predetermined antenna ports for a UE-specific reference signal,
    wherein the data is transmitted from the base station to the UE with the UE-specific reference signal through the predetermined antenna ports,
    wherein when the UE is configured with a precoding matrix index reporting, the UE computes the channel quality indicator under an assumption that the physical downlink shared channel transmission scheme is a closed-loop spatial multiplexing scheme based on the common reference signals, and
    wherein when the UE is not configured with the precoding matrix index reporting, the UE computes the channel quality indicator under an assumption that the physical downlink shared channel transmission scheme is a transmit diversity scheme based on the common reference signals.

2. The method of claim 1, wherein when the UE is not configured with the precoding matrix index reporting, the UE computes the channel quality indicator under an assumption that a precoding matrix of an identity matrix form or a precoding matrix combined with an identity matrix has been applied.

3. The method of claim 1, wherein, when the UE is not configured with the precoding matrix index reporting, the UE computes the channel quality indicator under an assumption that a first precoding matrix or a second precoding matrix has been applied according to a unit time.

4. The method of claim 1, wherein, when the UE is configured with the precoding matrix index reporting, a maximum rank of the assumed closed-loop spatial multiplexing scheme is 2.

5. The method of claim 1, wherein whether or not the UE is configured with the precoding matrix index reporting is signaled through a higher layer.

6. A user equipment (UE) in a wireless communication system, comprising:
- a reception module for receiving one or more common reference signals from a base station;
- a processor for computing a channel quality indicator for dual-layer transmission of a physical downlink shared channel, based on the one or more common reference signals; and
- a transmission module for transmitting the channel quality indicator for the dual-layer transmission to the base station,
- wherein data is mapped to each of a first layer and a second layer corresponding to predetermined antenna ports for a UE-specific reference signal,
- wherein the data is transmitted from the base station to the UE with the UE-specific reference signal through the predetermined antenna port,
- wherein when the UE is configured with a precoding matrix index reporting, the UE computes the channel quality indicator under an assumption that the physical downlink shared channel transmission scheme is a closed-loop spatial multiplexing scheme based on the common reference signals, and
- wherein when the UE is not configured with the precoding matrix index reporting, the UE computes the channel quality indicator under an assumption that the physical downlink shared channel transmission scheme is a transmit diversity scheme based on the common reference signals.

7. The user equipment of claim 6, wherein when the UE is not configured with the precoding matrix index reporting, the UE computes the channel quality indicator under an assumption that a precoding matrix of an identity matrix form or a precoding matrix combined with an identity matrix has been applied.

8. The user equipment of claim 6, wherein, when the UE is not configured with the precoding matrix index reporting, the UE computes the channel quality indicator under an assumption that a first precoding matrix or a second precoding matrix has been applied according to a unit time.

9. The user equipment of claim 6, wherein, when the UE is configured with the precoding matrix index reporting, a maximum rank of the assumed closed-loop spatial multiplexing scheme is 2.

10. The user equipment of claim 6, wherein whether or not the UE is configured with the precoding matrix index reporting is signaled through a higher layer.

* * * * *